Figure 1:
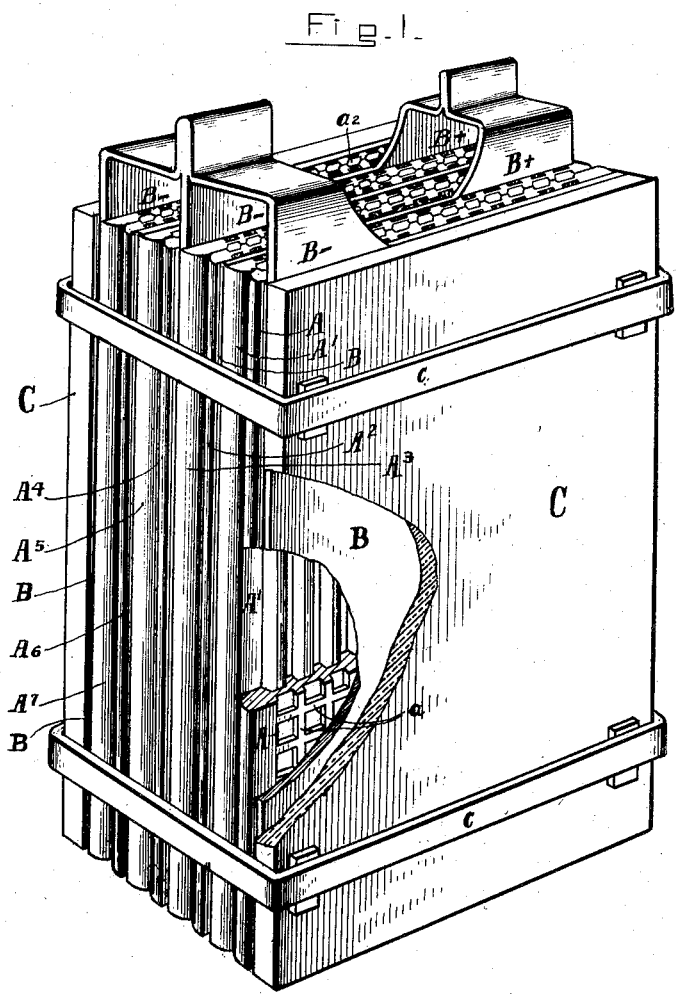

G. J. JOHNSON.
SECONDARY BATTERY.
APPLICATION FILED MAR. 28, 1910.

969,876.

Patented Sept. 13, 1910.

3 SHEETS—SHEET 1.

WITNESSES
Edith Wilcox
Elizabeth Breen

INVENTOR
G. J. Johnson
By Coburn & McRoberts
his ATTYS

G. J. JOHNSON.
SECONDARY BATTERY.
APPLICATION FILED MAR. 28, 1910.
969,876.
Patented Sept. 13, 1910.
3 SHEETS—SHEET 2.
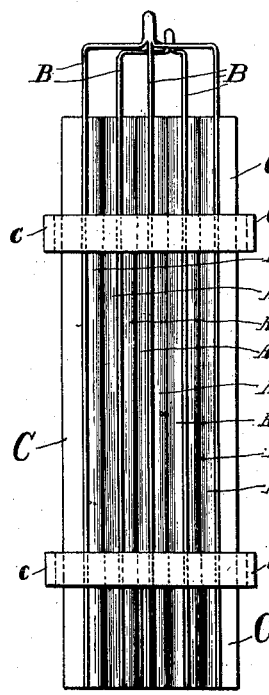
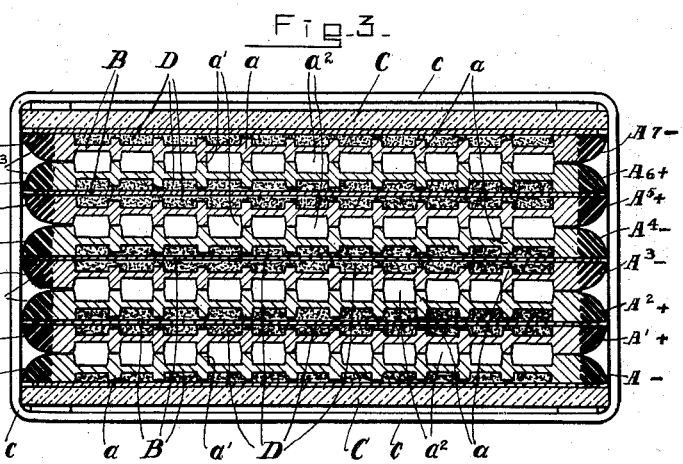
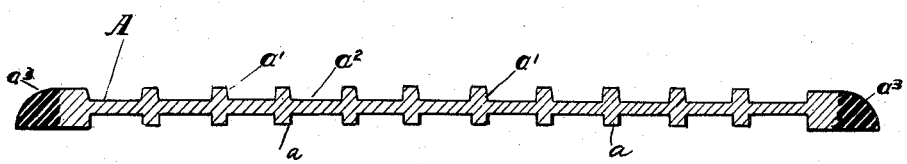

G. J. JOHNSON.
SECONDARY BATTERY.
APPLICATION FILED MAR. 28, 1910.
969,876.
Patented Sept. 13, 1910.
3 SHEETS—SHEET 3.
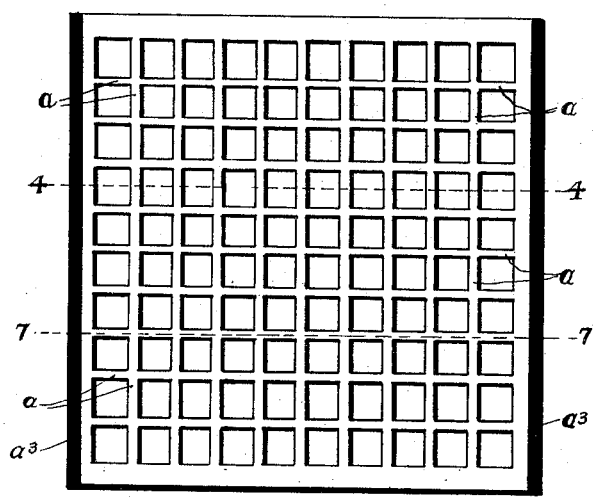
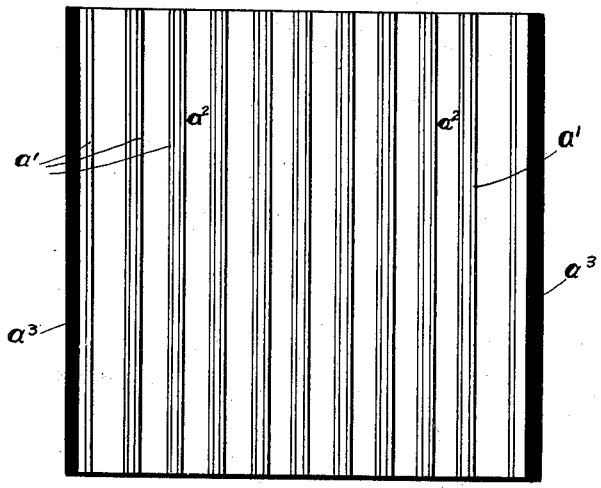

UNITED STATES PATENT OFFICE.

GUSTAVUS J. JOHNSON, OF CHICAGO, ILLINOIS.

SECONDARY BATTERY.

969,876.     Specification of Letters Patent.     Patented Sept. 13, 1910.

Application filed March 28, 1910. Serial No. 551,987.

*To all whom it may concern:*

Be it known that I, GUSTAVUS J. JOHNSON, a citizen of the United States, residing at Chicago, in the county of Cook and State of Illinois, have invented certain new and useful Improvements in Secondary Batteries, of which the following is a specification, reference being had therein to the accompanying drawing.

The invention has reference to the type of secondary battery constructed on the well known "Hatch principle" consisting of end-supporting plates between which are a series of electrodes and interposed porous plates, said porous plates being serrated or formed to provide pockets or receptacles on one side for active material or material adapted to become active and hold this material in contact with metallic electrodes, the other or reverse side of said porous plates being channeled to provide recesses for vertical circulation of electrolyte for free access to all parts of said porous plates. The practical defects in such batteries are due to the fact that the permeability of the porous plates will cause their edges to absorb and hold adhering thereto a portion of the metallic oxid paste that constitutes the base mixture of the active material, and the portions of the oxid paste so held or absorbed by the edges will when the voltaic couples of a battery are assembled and placed in commission form a conducting body for the current causing a passover or short circuit from one element to the other with consequent inefficiency and gradual destruction of the battery from internal discharge. This fact was recognized by Hatch in his Patent #585,473 dated June 29, 1897 where the practice of staggering the horizontal joints in a sectional porous plate was claimed as advantageous, but obviously this is not a remedy possible to apply to the outside edges of the plates.

Later practitioners have endeavored to stop the creeping tendencies of vagrant electric currents over the pathway of the electrically formed active material that may be adhering to or permeating the edges of the porous plates by closing the sides and bottoms of the elements, causing the battery to show high internal resistance by reason of throttled circulation.

The objects of my invention are to provide mechanically the means by which the electro-chemistry of such a secondary battery can be corrected, by so constructing my porous plates that all parts of said plates except the edges will be permeable and allow access of the electrolyte to the material that is active or intended to be active, while the edges of said porous plates originally made homogeneous with other portions of the plates themselves are made impervious to the electrolyte, non-conducting to the electric current, and insulating to metallic structures when such are brought in contact therewith. I also reduce to a minimum the internal resistance of the battery by promoting circulation of electrolyte and free passage of current at the sides and bottom as well as the top of the assembled elements and at the same time insure the assembled voltaic couples within the battery against deterioration and destruction from local action or short circuits.

To attain the ends sought I chamfer or bevel the edges of the porous plates from the reverse side forward and to and through the edges so chamfered I apply an acid-resisting, electrically non-conducting substance that prevents active material on the filled plates to adhere to their edges, making local action impossible between adjacent plates of unlike polarity, as would take place in plates not so treated. My method in these respects is a complete reversion of the practice of J. P. Clare under his Patent No. 650,808 under which all circulation at the edges of couples is intended to be effectually shut off, and it is also a distinct reversal of the practice of C. H. Clare under his Patent No. 717,351 under whose practice insulating plates are applied to the edges and bottom of the couples in order to stop sidewise and downward circulation. Both practices just referred to cause a high internal resistance of the battery during charge and discharge, as direct circulatory action can only take place at the tops of the plates but not at the sides or the bottom.

The results of my invention are a free circulation on all sides of the assembled elements and a reduction to a minimum of the internal resistance of the battery, and the elimination of local action or short circuits between the plates. My manner of shaping and treating the edges of the plates and making the same non-conductors of electric current also prevents short-circuits through the metal bands used for holding the elements together, should such metal bands be crowded accidentally against the sides of the couples, and therefore removes one of the principal causes of self destruction to which all such batteries are otherwise liable.

My invention provides a decided improvement upon existing battery practice, and admits of great economy and high efficiency; also by dispensing with the use of insulating plates and with other exacting and expensive details of manufacture the usual cost of producing a battery of this type is greatly reduced.

A practical application of the principles of my invention may be understood from the accompanying drawings, in which—

Figure 1 is a perspective view of the features of my invention embodied in a battery, with parts broken away to show the different faces of two of the porous plates; Fig. 2 is a side view of the same; Fig. 3 is a horizontal cross sectional view of the same; Fig. 4 is a cross sectional view of one of the porous plates on line 4—4 of Fig. 5 crossing the cavities holding the active material; Fig. 5 is a plan view of the face of one of the porous plates; Fig. 6 is a plan view of the reverse side or back of one of the porous plates, and Fig. 7 is a sectional view on the line 7—7 of Fig. 5 along one of the ridges on the face of the porous plate.

In the drawings the cell is composed of two voltaic couples, the porous permeable plates lettered A to $A^7$ inclusive being arranged as shown with metallic electrodes or conductor strips B; the plates $A'$, $A^2$, $A^5$, and $A^6$ are of like polarity, as positive, and the plates A, $A^3$, $A^4$, and $A^7$ are of like polarity, as negative. The pair of plates $A'$ and $A^2$, the pair $A^3$ and $A^4$, and the pair $A^5$ and $A^6$, respectively, constitute compound plates. The porous plates and electrodes are assembled with glass end-supporting plates C, all parts being bound together in place by any suitable binders $c$, preferably in the form of metallic bands.

The porous plates have active material D or material intended to be active upon their inner faces or surfaces, being provided with suitable pockets or receptacles for that purpose, as by crossed ridges $a$ forming a cellular surface thereon, and the lead electrodes are in close contact with the face of the active material; the outer faces or surfaces of the porous plates are provided with ribs $a'$ running lengthwise thereof and providing abutments for the plates, the abutments on adjacent plates of unlike polarity forming channels $a^2$ in which vertically circulates the electrolyte contained in the usual jar or receptacle (not shown). The lead electrodes or conducting plates B are slightly less in width or transverse cross-section than the porous plates as shown clearly in Fig. 3 so that the latter protect the edges of the former but provide circulation from them; it is of course understood that the number of voltaic couples or plates may be varied, as also will be the associated electrodes.

In the types of batteries as heretofore constructed the entire porous plates are pervious to the electrolyte for attack upon the active material, and so portions of the active material heretofore held or absorbed by their edges, when the voltaic couples are assembled and placed in commission, form a conducting body for the current thus causing short circuits between the plates of unlike polarity; and to obviate this defect I make the side edge of each plate impervious to the electrolyte and to the oxid paste and active material and non-conducting to the electric current by applying to and through these edges any suitable acid-resisting and non-conducting substance or material, such, for example, as di-atomaceous earths insoluble in inorganic oxy-acids, but attacked by other solvents; solutions of silicates insoluble in sulfuric acid, such as those of magnesium; solutions of india rubber in naphtha, benzine, benzol, nitro-benzol or carbon di-sulfid; also, a solution of cellulose in acetone may be used, but the product is too inflammable for practical use in a secondary battery this being shown in the drawings at $a^3$. This treatment insulates the plates from the metallic structure or bands $c$ when for any reason these parts may be accidentally crowded together, thus also preventing short circuiting through the bands. The side edges of the plates are also chamfered or beveled from the reverse side forward in order to form an increased gap between adjacent plates of unlike polarity to prevent short circuits. This prevents the electric current from creeping over the pathway formed by the active material adhering to or permeating the plates.

To provide for the free passage of the current at the sides and bottom as well as at the top of the assembled elements I expose all the edges of the metal electrodes or conducting sheets directly to the electrolyte, thus promoting conductance and decreasing internal resistance to a minimum, and by applying an acid-resisting, electrically non-conducting substance or material to the edges of the plates I obviate short-circuiting or local action, and so insure the assembled voltaic couples within the battery against deterioration and destruction, the beveling of the edges of the plates assisting in this result.

Having described my invention, I claim:

1. A plate for supporting active material in contact with the conductor of the electrodes of an electric battery, said plate having a surface permeable to the electrolyte and for the reception and retention of said active material, and having its edges impervious to the electrolyte and electrically non-conducting.

2. A plate for supporting active material in contact with the conductor of the electrodes of an electric battery, said plate having a surface permeable to the electrolyte and for the reception and retention of said active material, and having its edges beveled and impervious to the electrolyte and electrically non-conducting.

3. A plate for supporting active material in contact with the conductor of the electrodes of an electric battery, said plate having a surface permeable to the electrolyte and for the reception and retention of said active material, and having ribs on its opposite surface, and having its edges impervious to the electrolyte and electrically non-conducting.

4. A voltaic couple for a storage battery composed of a pair of compound elements, each of the elements composed of one or more pairs of porous plates having acid-resisting and electrically non-conducting edges, electrodes having their edges exposed to the free action of the electrolyte, the plates provided with the active material of the battery and having channels for the electrolyte.

5. A voltaic couple for a storage battery composed of a pair of compound elements, each of the elements composed of one or more pairs of porous plates, the adjacent plates of the elements having acid-resisting and electrically non-conducting edges, electrodes having their edges exposed to the free action of the electrolyte, the plates provided on one face with the active material of the battery and having channels on the opposite face for the electrolyte.

6. A storage battery consisting of compound elements composed of porous plates to the inner faces of which the active material of the battery is applied and intermediate conducting plates in contact with said active material, ribs on the outer faces of the porous plates to form channels for the electrolyte, end supporting plates and bands to hold the several parts assembled, the edges of the porous plates being impregnated with an acid-resisting and electrically non-conducting material.

7. A storage battery consisting of compound elements composed of porous plates to the inner faces of which the active material of the battery is applied and intermediate conducting plates in contact with said active material, ribs on the outer faces of the porous plates to form channels for the electrolyte, end supporting plates and bands to hold the several parts assembled, the edges of the porous plates being beveled and impregnated with an acid-resisting and electrically non-conducting material.

8. A storage battery consisting of compound elements composed of porous plates to the inner faces of which the active material of the battery is applied and intermediate conducting plates in contact with said active material and less in width than the porous plates, the porous plates having ribs on their outer faces to form channels for the electrolyte, end supporting plates and metallic bands to hold the several parts assembled, the edges of the porous plates being beveled and impregnated with an acid-resisting and electrically non-conducting material.

In testimony whereof I affix my signature in presence of two witnesses.

GUSTAVUS J. JOHNSON.

Witnesses:
GEORGE R. HARBAUGH,
J. McROBERTS.